United States Patent
Shojima et al.

(10) Patent No.: US 8,079,600 B2
(45) Date of Patent: Dec. 20, 2011

(54) SEALING STRUCTURE

(75) Inventors: Daihachi Shojima, Aso (JP); Hideto Nameki, Aso (JP)

(73) Assignee: NOK Corporation, Tokyo (JP)

( * ) Notice: Subject to any disclaimer, the term of this patent is extended or adjusted under 35 U.S.C. 154(b) by 584 days.

(21) Appl. No.: 11/919,992

(22) PCT Filed: Aug. 23, 2006

(86) PCT No.: PCT/JP2006/316450
§ 371 (c)(1),
(2), (4) Date: Nov. 7, 2007

(87) PCT Pub. No.: WO2007/026576
PCT Pub. Date: Mar. 8, 2007

(65) Prior Publication Data
US 2009/0066038 A1    Mar. 12, 2009

(30) Foreign Application Priority Data
Aug. 30, 2005  (JP) .................. 2005-249120

(51) Int. Cl.
*F16J 15/10* (2006.01)
(52) U.S. Cl. .......... 277/644; 277/587; 277/641
(58) Field of Classification Search ........... 277/641, 277/643, 644, 587
See application file for complete search history.

(56) References Cited

U.S. PATENT DOCUMENTS

| | | | | |
|---|---|---|---|---|
| 3,166,332 A * | 1/1965 | Olson | | 277/644 |
| 3,263,961 A * | 8/1966 | Varga | | 251/332 |
| 3,322,433 A * | 5/1967 | Rentschler | | 277/652 |
| 3,415,287 A * | 12/1968 | Lanza et al. | | 138/141 |
| 3,558,097 A * | 1/1971 | DeFrees | | 251/88 |
| 4,790,544 A * | 12/1988 | Kemp | | 277/314 |
| 4,825,015 A * | 4/1989 | Prott et al. | | 174/367 |
| 5,007,202 A * | 4/1991 | Guillon | | 49/441 |
| 5,482,297 A * | 1/1996 | Burns et al. | | 277/644 |
| 5,513,674 A * | 5/1996 | Frisch | | 137/625.69 |
| 6,328,316 B1 * | 12/2001 | Fukuhara et al. | | 277/644 |
| 6,523,833 B1 * | 2/2003 | Ishigaki et al. | | 277/650 |
| 6,755,422 B2 * | 6/2004 | Potter | | 277/652 |
| 6,962,348 B2 * | 11/2005 | Fink | | 277/608 |
| 7,306,237 B2 * | 12/2007 | Tsuji et al. | | 277/644 |
| 2008/0029972 A1 * | 2/2008 | Smathers et al. | | 277/641 |
| 2009/0066038 A1 * | 3/2009 | Shojima et al. | | 277/644 |
| 2009/0206558 A1 * | 8/2009 | Nameki | | 277/644 |

FOREIGN PATENT DOCUMENTS

| | | |
|---|---|---|
| JP | H9-510286 | 10/1997 |
| JP | H4-127460 | 11/2002 |
| JP | 2003-240123 | 8/2003 |
| JP | 2005-282864 | 10/2005 |
| JP | 2005-282865 | 10/2005 |

OTHER PUBLICATIONS

International Search Report dated Sep. 26, 2006.

* cited by examiner

*Primary Examiner* — Alison Pickard
(74) *Attorney, Agent, or Firm* — Jacobson Holman PLLC

(57) ABSTRACT

A sealing structure in which sealing is made by a seal ring installed in a dovetail groove where only an inner surface on one side of the groove is an inclined surface. In the sealing structure, the seal ring is less likely to come out of the dovetail groove, resistance of insertion of the seal ring into the dovetail is small, and particles are less likely to occur in the structure. The seal ring is formed of a rubber-like elastic material and is installed in the dovetail groove where the first inner surface on one side of the groove is inclined falling to the inside of the groove.

4 Claims, 6 Drawing Sheets

SEALING STRUCTURE

This is a national stage of the International Application No. PCT/JP2006/316450 filed on Aug. 23, 2006 and published in Japanese.

BACKGROUND OF THE INVENTION

1. Field of the Invention

The present invention relates to a technique preferably used as a sealing means of a chamber or the like used in a production of a semiconductor, a liquid crystal device or the like, and more particular, to a sealing structure for sealing by a seal ring which is installed in a dovetail groove formed at one of parts facing each other and provided between the parts with an appropriate deformable margin.

2. Description of the Conventional Art

A semiconductor production device or a liquid crystal product production device uses various vacuum treatment systems and carries out processing steps of a silicon wafer or a liquid crystal glass, which are needed for producing a semiconductor device, under a vacuum condition. FIGS. 7(A) to 7(C) are cross sectional views for illustrating plural kinds of sealing structures used in a conventional technique for sealing opening/closing portions such as a gate valve, a slit valve, a chamber lid and the like in a vacuum chamber so as to make such the vacuum condition.

In the sealing structures illustrated in FIGS. 7(A) to 7(C), FIG. 7(A) is a sealing structure in which an O ring 200 is installed in a dovetail groove 100 where both inner surfaces 101 and 102 at both sides are inclined to fall toward the inside of the groove 100 (for example, refer to Japanese Patent Application Laid Open No. 2003-240123 and Japanese Utility Model Laid Open No. 4 (1992)-127460). FIG. 7(B) is a sealing structure in which an O ring 200 is installed in a dovetail groove 110 where one inner surface 111 is inclined to fall toward the inside of the groove 110 and another inner surface 112 is vertically extended from a groove bottom 113. FIG. 7(C) is a sealing structure in which an O ring 200 is installed in a dovetail groove 120, where one inner surface 121 is inclined to fall toward the inside of the groove 120 and another inner surface 122 is vertically extended from a groove bottom 123, and a groove shoulder 124 at the inclined side bites the O ring 200.

As for the sealing structure in FIG. 7(A), the dovetail groove 100 is in the cross sectional shape where both inner surfaces 101 and 102 at both sides are inclined to fall toward the inside of the groove 100. So, an engagement allowance ($W_{200}-W_{100}$) generated by the difference between an opening width $W_{100}$ of the dovetail groove 100 and a cross sectional width $W_{200}$ of the O ring 200 is large. Thus, when the opposite member, which is not illustrated, is opened, it can be effectively prevented for the O ring 200 to come out of the dovetail groove 100 to slip off, even if the O ring 200 adheres to the opposite member. However, in the processing of the dovetail groove 100, a groove is formed by using a milling machine at first, and then, the inside of the groove is cut by an end mill so as to form the illustrated cross sectional shape. In this case, twice cutting processes are needed for the inner surface 101 and the inner surface 102 using a forming tool, so that there is a problem that a processing cost increases.

As for the dovetail groove 110 illustrated in FIG. 7(B), since only the inner surface 111 at one side is the inclined surface, the cutting process using the forming tool is needed only one time, and a lathe processing can be carried out, so that the groove 110 can be machined with a low cost. However, the engagement margin ($W_{200}-W_{100}$) of the O ring 200 to the dovetail groove 110 is small, and one side of the O ring 200 is not engaged. So, when the opposite member, which is not illustrated, is opened, the O ring 200 may easily come out of the dovetail groove 110 to fall off, if the O ring 200 adheres to the opposite member.

Further, as for the dovetail groove 120 illustrated in FIG. 7(C), since only the inner surface 121 at one side is the inclined surface like the dovetail groove 110 illustrated in FIG. 7(B), the groove 120 can be machined with a low cost. Further, since the O ring 200 is installed in the dovetail groove 120 in such manner that the groove shoulder 124 bites the O ring 200, a necessary engagement margin ($W_{200}-W_{100}$) of the O ring 200 to the dovetail groove 120 can be kept. Thus, the O ring 200 hardly comes out of the groove 120. However, the O ring 200 is forcibly passed between the groove shoulders 124 and 125 when it is fitted into the dovetail groove 120, and thus resistance of insertion is large and installation property is poor. Further, the structure of FIG. 7(C) has the flowing problems.

FIG. 8 illustrates the state where poor installation of the O ring 200 in the dovetail groove 120 occurs FIG. 7(C). As illustrated in FIG. 8, the O ring 200 is not completely inserted into the dovetail groove 120 due to the resistance of insertion with respect to the dovetail groove 120, so as to be waved. As a result of this, the state of uniform installation to the whole periphery cannot be obtained, so that sealing property may be unstable.

Further, FIG. 9 is an explanation view for illustrating an analysis result of stress distribution generated in the O ring 200 in the structure illustrated in FIG. 7(C) by an FEM analysis. In FIG. 9, a portion H has high stress, and a portion L has low stress. As illustrated in FIG. 9, when the O ring 200 receives a close contact load with the opposite member 130, the stress is remarkably increased at portions of the O ring 200 contacting to the groove shoulders 124 and 125 of the dovetail groove 120. Therefore, when the opposite member 130 is repeatedly opened and closed, the portions contacting to the groove shoulders 124 and 125 are abraded so as to easily generate particles which are harmful in the production of semiconductor and liquid crystal products. Further, the O ring 200 is waved at the time of inserting or due to opening/closing of the opposite member 130, so that sealing property may be unstable.

SUMMARY OF THE INVENTION

Problems to be Solved by the Invention The present invention is to solve the above-described problems, and a technical objective of the present invention is to provide a sealing structure in which a sealing is made by a seal ring installed in a dovetail groove where only an inner surface at one side of the groove is an inclined surface, the seal ring hardly comes out of the dovetail groove, resistance of insertion of the seal ring into the dovetail groove is small, and particles are hardly generated.

Means for Solving the Problems

In order to effectively solve the above-described technical problems, a sealing structure according to a first aspect of the present invention has the following feature. A seal ring is made of a rubber-like elastic material and installed in a dovetail groove, where a first inner surface at one side of the groove is inclined to fall toward the inside of the groove. The seal ring has, at an insertion section to be inserted into the dovetail groove, a side projection surface which comes into close contact with the first inner surface, a bottom surface which is capable of coming into close contact with a groove bottom of the dovetail groove and has a width less than a groove width between groove shoulders, and a side upward-facing inclined surface which is capable of coming into close contact with a second inner surface at the opposite side to the first inner surface and is inclined with the bottom surface side thereof projecting.

In the above-described structure, the bottom surface of the insertion section of the seal ring into the dovetail groove has the smaller width than the groove width between the groove shoulders of the dovetail groove. Thus, in the process of inserting the seal ring into the dovetail groove, resistance of insertion is zero at an initial step of insertion. Then, while the resistance of insertion is gradually increased by the side projection surface, the side projection surface is passed between the groove shoulders so as to come into close contact with the inclined first inner surface. At this time, since the side upward-facing inclined surface which has been inserted in advance guides the insertion by contacting to the second inner surface, the seal ring can be easily inserted without twisting. Further, after the seal ring is inserted into the dovetail groove, the insertion section is held between the groove shoulder at the first inner surface side in the dovetail groove and a corner section between the groove bottom and the second inner surface side. Thus, a deformable margin of the O ring for biting of the groove shoulder is not necessary. Therefore, coming out of the dovetail groove can be effectively prevented, and stress concentration at portions contacting to the groove shoulders can be prevented.

A sealing structure according to a second aspect of the present invention has the flowing feature in the constitution described in the first aspect. A projection section between the bottom surface and the side upward-facing inclined surface of the seal ring is processed to have a round face or chamfered.

A sealing structure according to a third aspect of the present invention has the flowing feature in the constitution described in the first aspect. An exposing section of the seal ring from the dovetail groove is coated or applied with an anti-tack material. In this case, PTFE or silicon is preferably coated as the anti-tack material, and fluorine grease is preferably applied as the anti-tack material.

Effectiveness of the Invention

According to the sealing structure of the first aspect of the present invention, the dovetail groove is formed so as to incline a first inner surface at one side of the groove to be fallen toward the inside of the groove. Thus, a processing cost of the dovetail groove does not increase. The insertion section of the seal ring is engaged with and held between the groove shoulder at the first inner surface side in the dovetail groove and the corner section between the groove bottom and the second inner surface side. Thus, coming out of the dovetail groove, and generation of the particles by stress concentration can be prevented. Further, when the seal ring is installed into the dovetail groove, the seal ring is not twisted and waved by the resistance of insertion, so that stable sealing property can be exercised.

According to the sealing structure of the second aspect of the present invention, slight decrease of insertion property by the projection section between the bottom surface and the side upward-facing inclined surface is prevented, so that the seal ring can be more easily installed into the dovetail groove.

According to the sealing structure of the third aspect of the present invention, although the bottom surface of the seal ring may be adhered with the groove bottom, the exposing section of the seal ring from the dovetail groove is not adhered with the closely contacting opposite member. Thus, it can be prevented for the seal ring to come out of the dovetail groove due to adhesion with the opposite member.

DETAILED DESCRIPTION OF PREFERRED EMBODIMENT

Figure 1:
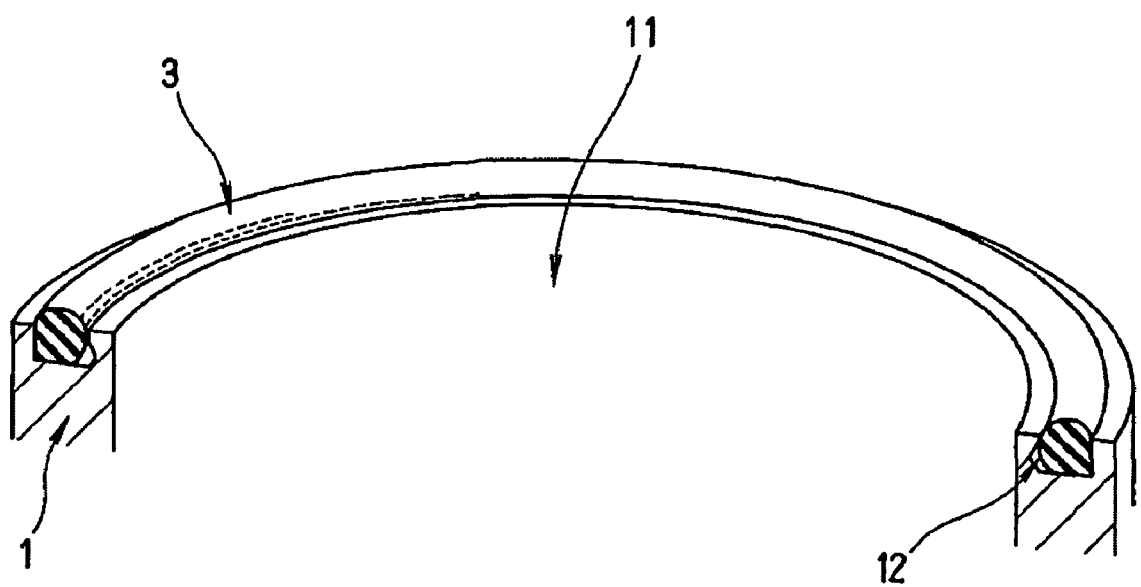
FIG. 1 is a cross sectional perspective view for illustrating a preferred embodiment of a sealing structure according to the present invention.
Figure 2:
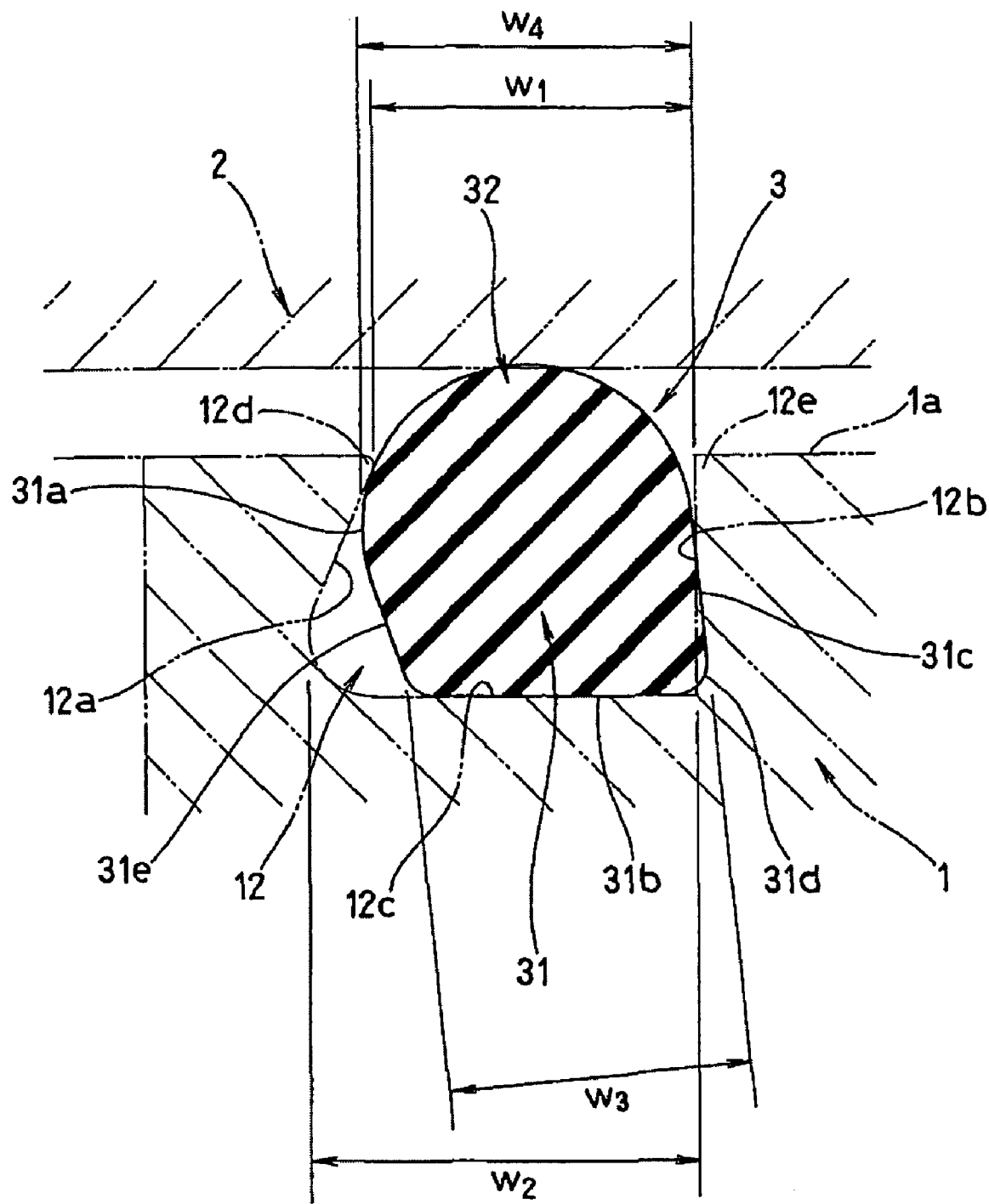
FIG. 2 is a partial cross sectional view for illustrating the relationship among a seal ring, a dovetail groove and an opposite member in the embodiment of FIG. 1.
Figure 3:
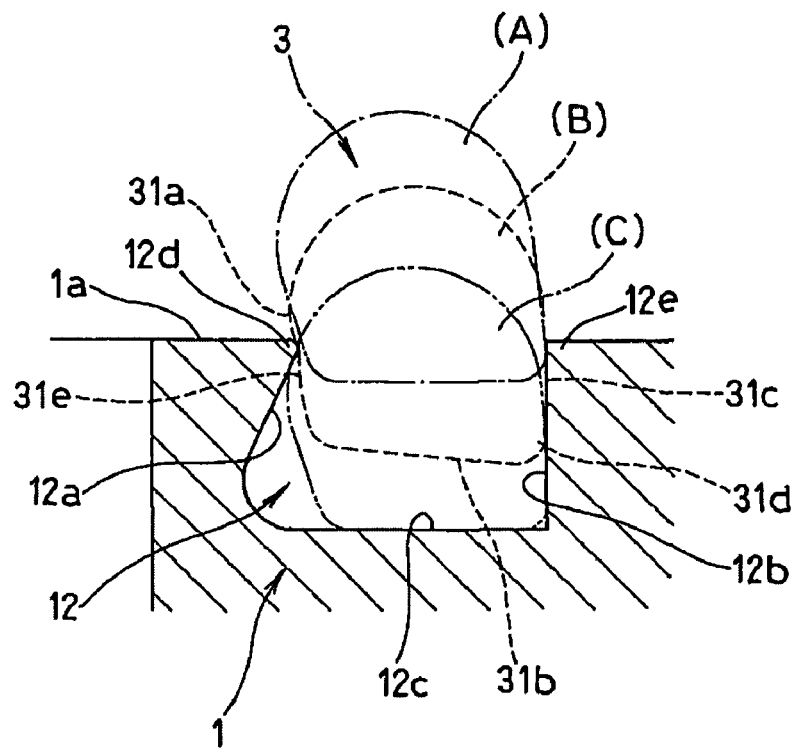
FIG. 3 is an explanation view for illustrating an installing process of the seal ring into the dovetail groove in the embodiment of FIG. 1.

FIG. 1 is a cross sectional perspective view for illustrating a preferred embodiment of a sealing structure according to the present invention. FIG. 2 is a partial cross sectional view for illustrating the relationship among a seal ring, a dovetail groove and an opposite member in the embodiment of FIG. 1. FIG. 3 is an explanation view for illustrating an installing process of the seal ring into the dovetail groove in the embodiment of FIG. 1.

In FIG. 1, a reference symbol 1 is a first member. For example, the first member 1 constitutes a part of a gate valve, a slit valve or a chamber lid of a coater/developer, a plasma etching device, a plasma CVD device, an ashing device, a vacuum pump and the like, which are used in a semiconductor production device. The first member 1 includes an opening section 11, which is opened and closed by a second member 2 illustrated in FIG. 2, at an inner periphery thereof. A seal ring 3 is installed into a dovetail groove 12 formed along an outer periphery of the opening section 11.

As illustrated in FIGS. 2 and 3, the dovetail groove 12 includes a first inner surface 12a at the inner periphery side thereof, a second inner surface 12b at the outer periphery side thereof, and a flat groove bottom 12c. As for the dovetail groove 12, the second inner surface 12b is approximate-vertically formed with respect to an upper surface 1a and the groove bottom 12c of the first member 1. On the other hand, the first inner surface 12a is inclined so as to fall toward the inside of the groove. Therefore, a groove width $W_1$ at the groove shoulders 12d and 12e side is relatively small, but a groove width $W_2$ at the groove bottom 12c side is relatively large.

Therefore, as for the dovetail groove 12, since only the first inner surface 12a at one side of the groove is the inclined surface, the cutting processing for making the side face of the groove to have the inclined surface is only one time, so that the processing can be carried out with a low cost.

The seal ring 3 is formed in an annular shape with a rubber-like elastic material. As illustrated in FIG. 1, the seal ring 3 includes an insertion section 31 and an exposing section 32, and when the seal ring 3 is fitted into the dovetail groove 12, the insertion section 31 is inserted into the dovetail groove 12, and the exposing section 32 is exposed from the dovetail groove 12. The insertion section 31 includes: a side projection surface 31a which comes into close contact with the inclined first inner surface 12a in the dovetail groove 12; a bottom surface 31b which is capable of coming into close contact with the groove bottom 12c in the dovetail groove 12 and has a width $W_3$ less than a groove width $W_1$ between the groove shoulders 12d and 12e; and a side upward-facing inclined surface 31c which comes into close contact with the approximately vertical second inner surface 12b in the dovetail groove 12 and is inclined with the bottom surface 31b side thereof projecting to the second inner surface 12b side.

A cross section of the exposing section 32 of the seal ring 3 has an arc shape continuous with the side projection surface 31a, and continues smoothly to the side upward-facing inclined surface 31c. Further, the bottom surface 31b is formed to be flat and a projection section 31d between the bottom surface 31b and the side upward-facing inclined surface 31c is processed to have a round face or chamfered. In the illustrated embodiment, the projection section 31d has a round face. Further, a side downward-facing inclined surface 31e, which is inclined so as to smoothly project toward the side projection surface 31a, is formed from an end portion of the bottom surface 31b at the opposite side to the side upward-facing inclined surface 31c.

A maximum width $W_4$ of the seal ring 3 with respect to the groove width direction of the dovetail groove 12 is made slightly larger than the groove width $W_1$ between the groove shoulders 12d and 12e on the both sides in the width direction by the side projection surface 31a.

The seal ring 3 has a slight deformable margin with the side projection surface 31a coming into close contact with a near end portion at the groove shoulder 12d side in the first inner surface 12a of the dovetail groove 12, and also has a slight deformable margin with the side upward-facing inclined surface 31c coming into close contact with the second inner surface 12b of the dovetail groove 12. The deformable margin in the side upward-facing inclined surface 31c to the second inner surface 12b is made larger toward the bottom surface 31b side. Thereby, the side projection surface 31a comes into close contact with the first inner surface 12a, with a reduced biting amount by the groove shoulder 12d.

In order to install the seal ring 3 into the dovetail groove 12 in the above-described constitution, the insertion section 31 of the seal ring 3 is inserted from the state (A) illustrated with a single-dot dashed line in FIG. 3 to the state (C) illustrated with a double-dot dashed line through the state (B) illustrated with a broken line.

That is, the width ($W_3$ in FIG. 2) of the bottom surface 31b of the seal ring 3 is less than the groove width ($W_1$ in FIG. 2) between the groove shoulders 12d and 12e. Thus, at the time of the initial step of insertion illustrated with the single-dot dashed line (A) in FIG. 3, the resistance of insertion into the dovetail groove 12 is zero.

Then, when the insertion section 31 is inserted further, the side downward-facing inclined surface 31e of the seal ring 3 interferes with the groove shoulder 12d at the inclined first inner surface 12a side. However, as illustrated with the broken line (B) in FIG. 3, the seal ring 3 is inserted along the second inner surface 12b while being slightly inclined and deformed using apart contacting to the groove shoulder 12d as a fulcrum. At this time, the projection section 31d having a round face between the bottom surface 31b and the side upward-facing inclined surface 31c is slightly advanced. Further, the resistance of insertion generated by biting of the groove shoulder 12d is gradually increased as the part contacting to the groove shoulder 12d moves toward the side project ion surface 31a side. However, since the seal ring 3 is inclined and deformed as described above, increase of the biting amount of the groove shoulder 12d into the side projection surface 31a can be suppressed. Thus, the side project ion surface 31a can enter into the inside beyond the groove shoulder 12d with the low resistance of insertion.

Further, after entering into the inside beyond the groove shoulder 12d, the side projection surface 31a is displaced toward the inclined first inner surface 12a side by recovering force of the seal ring 3 so as to bring the bottom surface 31b into close contact with the groove bottom 12c, and then, the seal ring 3 is in the complete insertion state as illustrated with the double-dot dashed line in FIG. 3. In this case, the bottom surface 31b and the side upward-facing inclined surface 31c of the seal ring 3 are guided by the groove bottom 12c and the second inner surface 12b of the dovetail groove 12. Thus, the seal ring 3 can be installed into the dovetail groove without twisting or waving induced by the resistance of insertion. Furthermore, since the side upward-facing inclined surface 31c and the projection section 31d advance so as to guide the insertion of the seal ring 3, the seal ring 3 can be easily installed with the low resistance of insertion.

Further, it is also effective to improve the installation property by applying grease or the like to the side upward-facing inclined surface 31c of the seal ring 3 for decreasing friction with the second inner surface 12b of the dovetail groove 12.

As for the sealing structure according to this embodiment, the second member 2 is brought into close contact with the exposing section 32 of the seal ring 3, which is exposed from the dovetail groove 12 of the first member 1, with proper load, so that the seal ring 3 is compressed so as to generate a reaction force. Then, by this reaction force, the side projection surface 31a, the bottom surface 31b and the side upward-facing inclined surface 31c in the insertion section 31 of the seal ring 3 come into close contact with the inner surface of the dovetail groove 12 with proper surface pressure, so as to exercise the sealing function. Further, since the seal ring 3 is not twisted or waved by the resistance of insertion, the stable sealing function can be obtained.

Figure 4:
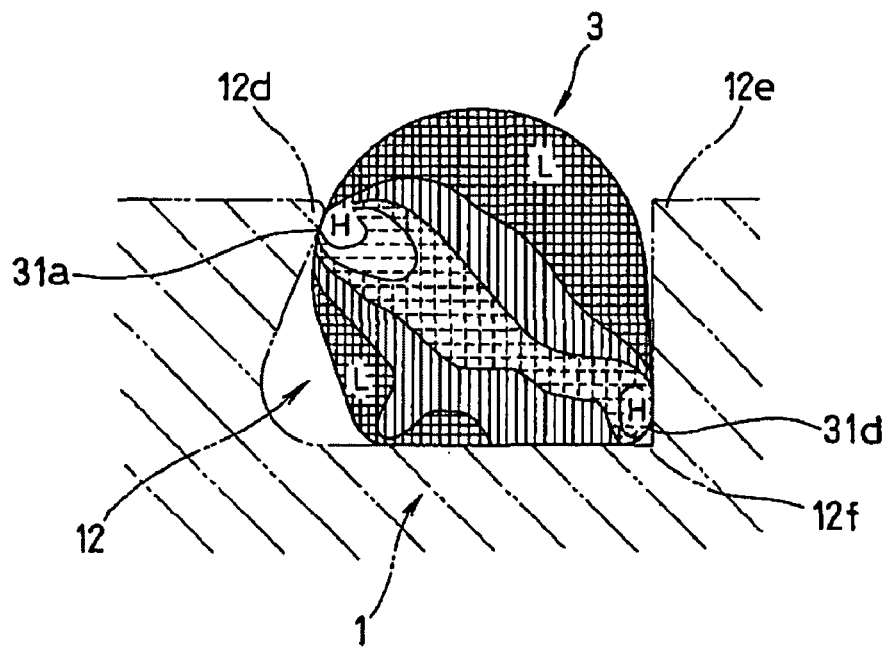
FIG. 4 is an explanation view for illustrating an analysis result of stress distribution generated in the seal ring in the embodiment of FIG. 1 by an FEM analysis.
Figure 5:
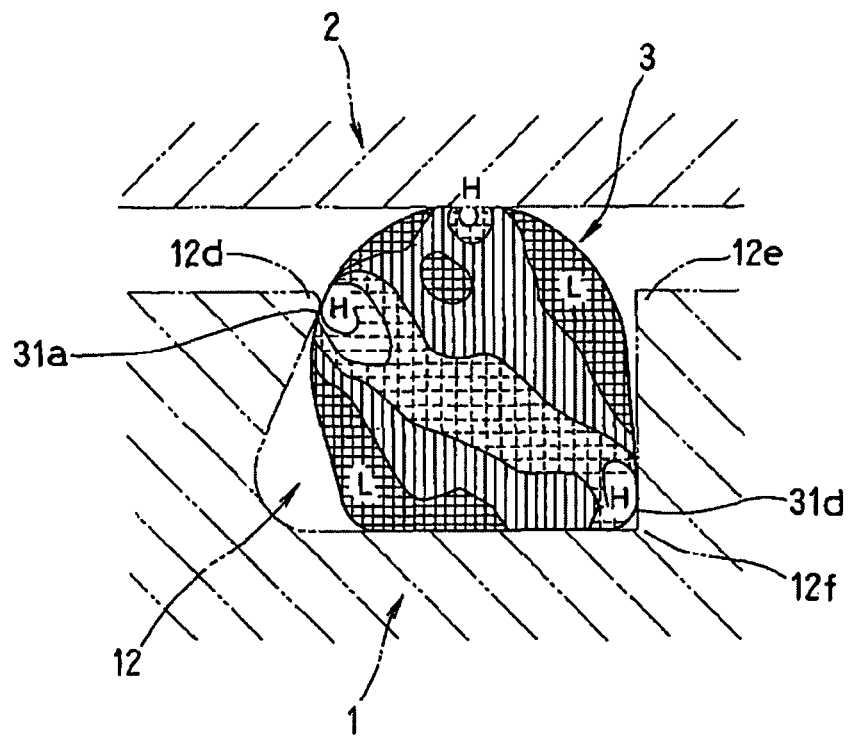
FIG. 5 is an explanation view for illustrating the analysis result of stress distribution generated in the seal ring in the embodiment of FIG. 1 by an FEM analysis under the condition that compression is given by a second member.

FIG. 4 is an explanation view for illustrating an analysis result of stress distribution generated in the seal ring in the embodiment of FIG. 1 by an FEM analysis. FIG. 5 is an explanation view for illustrating an analysis result of stress distribution generated in the seal ring in the embodiment of FIG. 1 by an FEM analysis under the condition that compression is given by the second member. In FIGS. 4 and 5, a portion H has high stress, and a portion L has low stress. That is, according the above-described embodiment, an area having high compression reaction force extends between the side projection surface 31a, which is engaged with the groove shoulder 12d at the first inner surface 12a side in the dovetail groove 12 having the engagement margin ($W_4$–$W_1$), and the projection section 31d, which is engaged with a corner section 12f between the groove bottom 12c and the second inner surface 12b, as clearly illustrated with stress distributions in FIGS. 4 and 5. Therefore, the seal ring 3 is held in the dovetail groove 12 in the state that the side projection surface 31a and the projection section 31d are engaged between the groove shoulder 12d and the corner section 12f.

Figure 9:
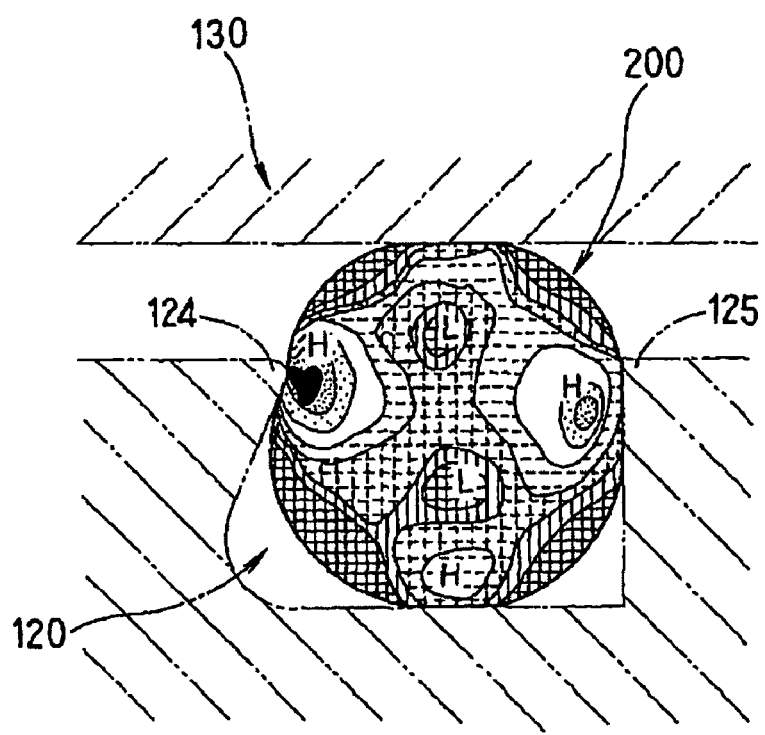
FIG. 9 is an explanation view for illustrating the analysis result of stress generated in an O ring 200 in the structure illustrated in FIG. 7(C) by a FEM analysis.

Further, in comparison with the FEM analysis results of compression reaction force in the conventional technique illustrated in FIG. 9, which is described above, the density of equal-stress lines in this embodiment is low, that is, the degree of concentration of the compression reaction force is low (about 0.6 MPa). The reason for this is that the seal ring 3 does not necessarily have a large deformable margin with respect to the dovetail groove 12 since the seal ring 3 is held in the state that the side projection surface 31a and the projection section 31d are engaged between the groove shoulder 12d and the corner section 12f as described above. Therefore, even if the second member 2 is repeatedly opened and closed, the portions contacting to the groove shoulder 12d and the second inner surface 12b are hardly abraded, and thus generation of the particles, which are harmful in the production of a semiconductor or a liquid crystal product, can be prevented.

Further, as illustrated in FIG. 2, when the seal ring 3 receives a compression load by the second member for a comparatively long time, the exposing section 32 of the seal ring 3 may be adhered to the second member 2 by the adhesiveness of the rubber-like elastic material of the seal ring 3. When the second member moves in the direction separating from the first member 1 (the upper direction in FIG. 2) in the state of such adhesion being kept, the seal ring 3 follows to move in the direction coming out of the dovetail groove 12. However, the flat bottom surface 31b of the insertion section 31 of the seal ring 3 is adhered to the flat groove bottom 12c, and the adhering area is larger than that of the exposing section 32 having a curved surface. Further, the side upward-facing inclined surface 31c generates large frictional force with respect to the second inner surface 12b, and the seal ring 3 has the engagement margin ($W_4$ $W_1$) between the side projection surface 31a and the groove shoulder 12d. Therefore, it can be effectively prevented for the seal ring 3 to come out of the dovetail groove 12 by adhesion to the second member 2, so as to be surely held in the dovetail groove 12.

Further, as illustrated in FIG. 2, when the seal ring 3 receives a compression load by the second member for a comparatively long time, the exposing section 32 of the seal ring 3 may be adhered to the second member by the adhesiveness of the rubber-like elastic material of the seal ring 3. When the second member moves in the direction separating from the first member 1 (the upper direction in FIG. 2) in the state of such adhesion being kept, the seal ring 3 follows to move in the direction coming out of the dovetail groove 12. However, the flat bottom surface 31b of the insertion section 31 of the seal ring 3 is adhered to the flat groove bottom 12c, and the adhering area is larger than that of the exposing section 32 having a curved surface. Further, the side upward-facing inclined surface 31c generates large frictional force with respect to the second inner surface 12b, and the seal ring 3 has the engagement margin ($W_4$-$W_1$) between the side projection surface 31a and the groove shoulder 12d. Therefore, it can be effectively prevent for the seal ring 3 to come out of the dovetail groove 12 by adhesion to the second member 2, so as to be surely held in the dovetail groove 12.

In addition, the following evaluation test was carried out. The seal ring, where the surface coming into close contact with the second member 2 is applied with an adhesive, is kept contacted with and compressed by the second member 2 for 30 minutes. Then, after the second member 2 and the seal ring are adhered, the second member is separated (opened) from the first member 1 so as to forcibly make the seal ring come out from the dovetail groove 12. The result of this evaluation test indicates that the load at the time of coming out is 537N when using the O ring as the seal ring, but the load at the time of coming out is 950N when using the seal ring of the above-described embodiment. Therefore, the effect to prevent coming out of the seal ring according to the present invention can be confirmed by this test.

Further, if the exposing section 32 of the seal ring 3 is coated with an anti-tack material made of PTFE or silicone or applied with fluorine grease or the like as the anti-tack material, the exposing section 32 is not adhered to the second member 2. Thus, it can be more surely prevented for the seal ring 3 to come out of the dovetail groove 12 by adhesion to the second member 2.

Figure 6:
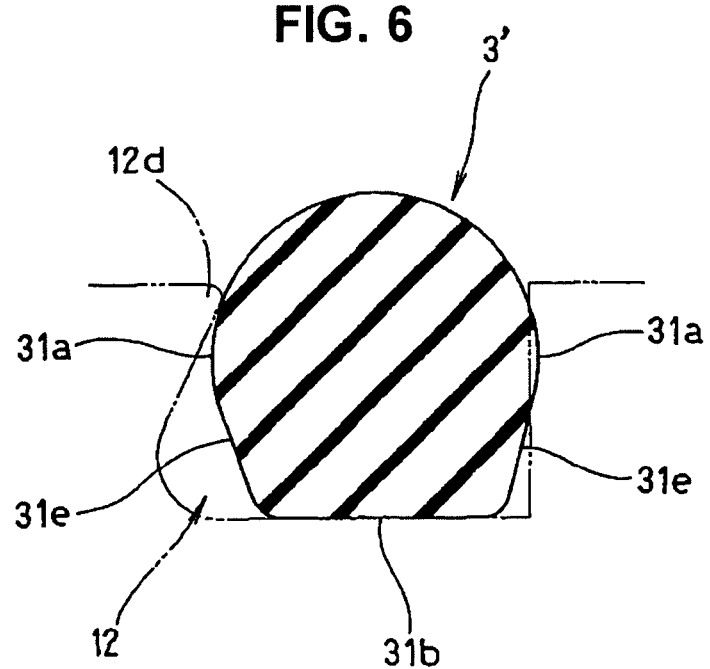
FIG. 6 is a partial cross sectional view for illustrating a sealing structure of a comparison example to the present invention.

FIG. 6 is a partial cross sectional view for illustrating a sealing structure of a comparison example to the present invention. As illustrated in FIG. 6, a seal ring 3' as a comparison example is formed to have side projection surfaces 31a and side downwardly-facing inclined surfaces 31e on the both sides and have a symmetrical cross sectional shape.

Figure 7A:
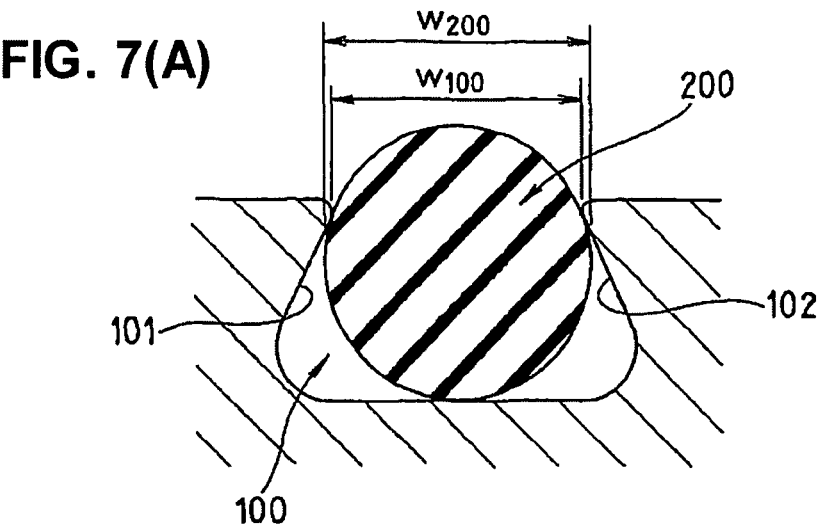
FIGS. 7(A) to 7(C) are cross sectional views for illustrating plural kinds of a sealing structure by a conventional technique for sealing an opening/closing portion in a vacuum chamber.
Figure 7B:
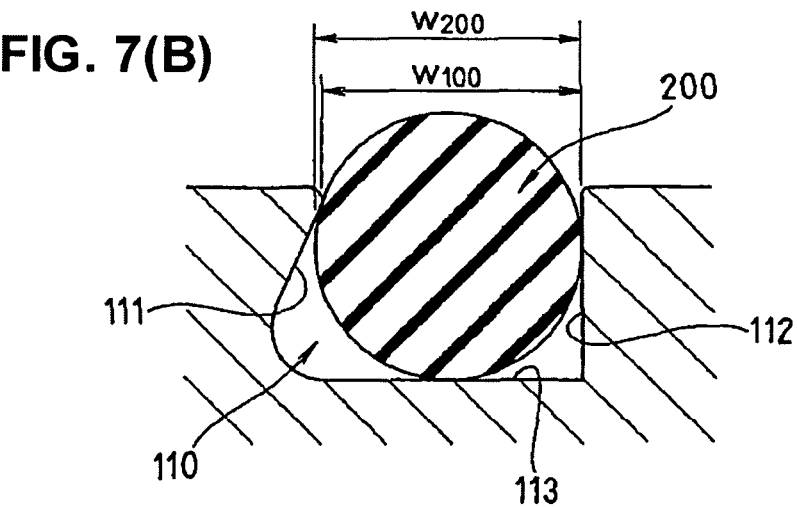
Figure 7C:
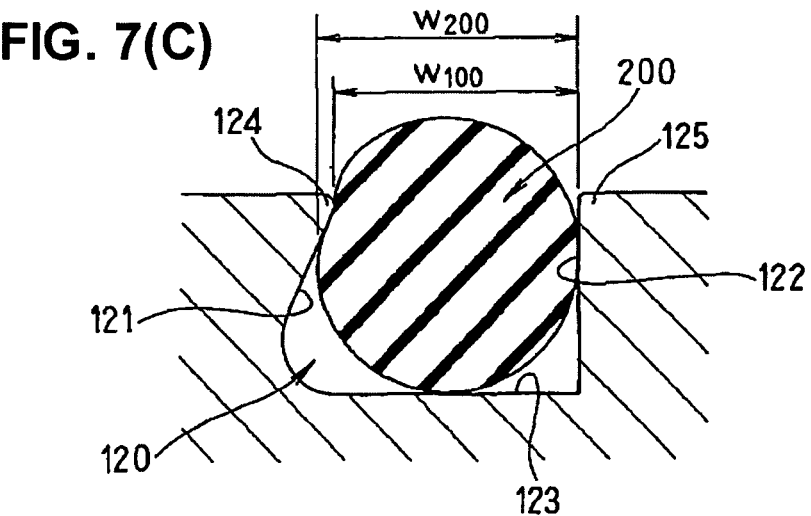
Figure 8:
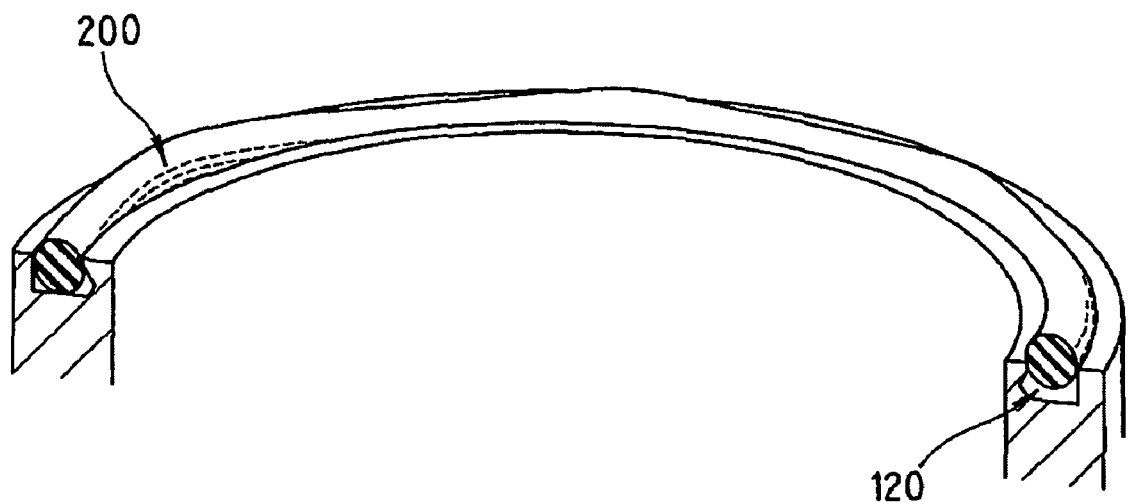
FIG. 8 is a perspective view for illustrating the state that poor installation of an O ring 200 occurs in a dovetail groove 120 in FIG. 7(C).

When the seal ring 3' is installed into the dovetail groove 12 illustrated in FIG. 2, the reaction force is concentrated by biting of the groove shoulder 12d at the inclined first inner surface 12a side, like the O ring in FIG. 7 described above. On the other hand, according to the seal ring 3 of the embodiment of FIG. 2, the side projection surface 31a is properly compressed and contacted with the inclined first inner surface 12a of the dovetail groove 12 by the compressing force from the projection section 31d side (from the lower right in FIG. 2), so that biting by the groove shoulder 12d hardly occurs, and a function to prevent coming out of the seal ring 3 can be obtained. Thus, it is advantageous.

INDUSTRIAL APPLICABILITY

The present invention can provide a sealing structure for sealing an opening/closing portion of a gate valve, a slit valve or a chamber lid of a coater/developer, a plasma etching device, a plasma CVD device, an ashing device, a vacuum pump and the like, which are used in a semiconductor production device for example. In the sealing structure, the seal ring is hardly comes out of the dovetail groove, resistance of insertion of the seal ring into the dovetail groove is small; and particles are hardly generated.

What is claimed is:

1. A sealing structure comprising
a seal ring made of a rubber-like elastic material and said seal ring being installed in a dovetail groove, said dovetail groove including a first inner surface at one side of the dovetail groove, the first inner surface being inclined to extend toward an inside of the dovetail groove and a second inner surface of the dovetail groove being located opposite to the first inner surface, the first inner surface of the dovetail groove and the second inner surface of the dovetail groove extending from a flat bottom surface of the dovetail groove, the second inner surface of the dovetail groove extending perpendicular to the flat bottom surface of the dovetail groove, and
the seal ring including, at an insertion section to be inserted into the dovetail groove, a side projection surface coming into close contact with the first inner surface, a bottom surface coming into close contact with the flat bottom surface of the dovetail groove and the seal ring having a width ($W_3$) less than a groove width ($W_1$) between groove shoulders of the dovetail groove and a side upward-facing inclined surface of the seal ring coming into close contact with the second inner surface at the opposite side to the first inner surface, a projection section of the seal ring being located between a flat bottom surface of the seal ring and the side upward-facing inclined surface of the seal ring, the projection section of the seal ring being configured to initially contact the second inner surface of the dovetail groove during insertion of the seal ring into the dovetail groove.

2. The sealing structure as claimed in claim 1, wherein an exposing section of the seal ring projected from the dovetail groove is coated or applied with an anti-tack material.

3. The sealing structure as claimed in claim 1, wherein the projection section of the seal ring has a round or chamfered face.

4. The sealing structure as claimed in claim 1, wherein the first inner surface terminates in one of the groove shoulders and the second inner surface terminates in the other of the groove shoulders with the seal ring secured by the projection section engaged with the second inner surface and the seal ring simultaneously engaged with the one of the groove shoulders.

* * * * *